Patented Mar. 8, 1932

1,848,266

UNITED STATES PATENT OFFICE

WALTER A. PATRICK AND EARLE H. BARCLAY, OF BALTIMORE, MARYLAND, ASSIGNORS TO THE SILICA GEL CORPORATION, OF BALTIMORE, MARYLAND, A CORPORATION OF MARYLAND

METHOD OF PREPARING TUNGSTEN OXIDE GEL

No Drawing. Application filed July 31, 1929. Serial No. 382,579.

This invention relates to a method of preparing a hard, stable, highly porous gel of tungsten oxide.

In our Patent No. 1,683,695 is described a process for making a tungsten oxide gel which comprises adding the acid to the tungstate solution with stirring until a precipitate forms, stopping the addition of acid until such precipitate redissolves with stirring, then adding the remainder of the acid to the tungstate solution, allowing the resulting sol to set to a hydrogel, washing and drying the hydrogel, the concentrations and proportions of the acid and tungstate solutions being such that the final acidity after reaction will be about 0.1 to 0.5 normal.

According to the present invention it has been found that the relative concentrations of the acid and tungstate solutions at and during the mixing control the presence or absence of the temporary intermediate precipitate. By selecting acid and tungstate solutions of proportions and concentrations such that when reacted together they produce a tungstic acid sol of an acidity of about 0.1 to 0.5 N, and then adjusting the concentrations of such solutions so that the concentration of one solution stands in a definite relation with respect to the concentration of the other solution, it is possible to produce a tungstic acid sol without the formation of a precipitate.

The acid and tungstate solutions, the relative concentrations of which are such that no temporary precipitate is formed may be mixed in any manner, as by adding the acid to the tungstate solution, or the two solutions may be brought together simultaneously.

At and during the mixing, the reaction mass may or may not be agitated. By agitating the reaction mass during the mixing it is possible to employ acid solutions of greater strength, and hence, obtain tungstic acid sols of higher acidity. Mixing the solutions without agitation also produces a tungstic acid sol without the appearance of the temporary precipitate but acid solutions of less concentration must be used. For example, a tungstic acid sol having an acidity of about 0.1 to 0.5 N may be produced without the formation of a temporary precipitate by adding an acid solution of about 8.8 N to a tungstate solution of about 4% strength without agitating the reaction mass during the mixing. If agitation is employed, an acid solution of about 15 N may be used in place of the 8.8 N acid solution. The sols obtained in either case have an acidity which falls within the range of 0.1 to 0.5 N but the acidity of the sol obtained from the reaction mass which has been agitated is higher than that obtained from the reaction mass which has not been agitated.

Using an aqueous solution of sodium tungstate of 10% strength, a tungstic acid sol having an acidity of 0.1 to 0.5 N may be produced without the formation of a temporary precipitate by adding an acid solution of about 2.8 N to said tungstate solution without agitating the reaction mass during the mixing. If the reaction mass is agitated, an acid solution of about 4.5 N may be used in place of 2.8 N.

If an aqueous sodium tungstate solution of about 6.5% is employed, then to obtain a sol with an acidity of about 0.1 to 0.5 N without precipitation an acid solution of about 5 N is added to the tungstate solution without agitation. If the mass is agitated during the mixing, an acid solution of about 8.5 N may be employed in place of 5 N.

The relationship of the concentration of the acid to the concentration of the tungstate is definite with respect to their upper limits. These definite limits can be described by a graphic representation in which the acid concentration and the corresponding tungstate concentrations are the coordinates. Since the examples herein disclosed set out a different concentration of acid where agitation is used than where no agitation is employed, two characteristic curves exist for the two conditions. The three specific examples of concentrations disclosed herein for each of the conditions are enough to construct the curves with sufficient accuracy.

The concentrations as observed at any point on these curves will, when mixed together, react in such manner as not to give a precipitate. If the concentration of either component is lessened, no precipitate will form. But if the concentration of either is increased without a corresponding decrease in the concentration of the other component so as to remain within the concentrations as indicated on the graph, objectionable precipitation will occur.

According to the present invention a highly porous gel of tungsten oxide may be prepared by adding a solution of an acid such as hydrochloric, sulphuric or nitric acid to a solution of sodium tungstate of about 4% to 10% strength. During the mixing the reaction mass may or may not be agitated. A tungstic acid sol having an acidity of about 0.1 to 0.5 N forms which coagulates or sets to a hydrogel in a few minutes, say from 4 to 30 minutes, at room temperature.

At a higher temperature the setting occurs more quickly and at lower temperatures more slowly. A good working range for the temperature is from 15° to 80° C. But it is to be understood that it is not necessary to work within this range.

The hydrogel formed as described is rather soft and must be washed carefully. It is broken into pieces and washed free from acid and salt. If the wash water is heated this step is expedited.

The washed hydrogel is then carefully dried to secure the final product. For this purpose the hydrogel is then first dried in a stream of air at 75° to 120° C. and after a time the temperature is slowly increased to 300° to 400° C. The hydrogel may be dried at a lower temperature, say 120° C. but this will take a longer time. The drying is continued until the water content of the final product is 5 to 15%, although the invention is not limited to dehydrating to these percentages. In a general way, it may be stated that the hydrogel is dehydrated to the desired water content which is usually not less than 3%. The hydrogel may be dehydrated in other ways known in the art.

Having thus described the invention what is claimed as new and desired to be secured by Letters Patent is:

1. The process of preparing a tungsten oxide gel without the formation of a temporary precipitate which comprises adding acid without interruption to a solution of a tungstate in such proportions that the final acidity after reaction will be about 0.1 N to 0.5 N, the concentration of the tungstate ranging from 4% to 10% and the concentration of the acid ranging from 15 N to 2.8 N, the greater the concentration of the tungstate selected, the less the concentration of the acid.

2. The process of preparing a tungsten oxide gel without the formation of a temporary precipitate which comprises adding acid without interruption to a solution of a tungstate without agitation in such proportions that the final acidity after reaction will be about 0.1 N to 0.5 N, the concentration of the tungstate ranging from 4% to 10% and the concentration of the acid ranging from 8.8 N to 2.8 N, the greater the concentration of the tungstate selected, the less the concentration of the acid.

3. The process of preparing a tungsten oxide gel without the formation of a temporary precipitate which comprises adding acid without interruption to a solution of a tungstate with agitation in such proportions that the final acidity after reaction will be about 0.1 N to 0.5 N, the concentration of the tungstate ranging from 4% to 10% and the concentration of the acid ranging from 15 N to 4.5 N, the greater the concentration of the tungstate selected, the less the concentration of the acid.

4. The process of preparing a tungsten oxide gel without the formation of a temporary precipitate comprising adding an acid without interruption to a solution of a tungstate without stirring in such proportions that final acidity after reaction will be about 0.1 N to 0.5 N, the relative concentration of the acid and tungstate used being not substantially more than those amounts indicated on a graphical curve constructed by employing the acid concentrations 2.8 N, 5 N and 8.8 N as coordinates in one plane and the tungstate concentrations 10%, 6.5% and 4%, as coordinates in the other plane, the points on the graph thus being 2.8, 10; 5, 6.5; and 8.8, 4.

5. The process of preparing a tungsten oxide gel without the formation of a temporary precipitate comprising adding an acid without interruption to a solution of a tungstate with vigorous stirring in such proportions that final acidity after reaction will be about 0.1 N to 0.5 N, the relative concentration of the acid and tungstate used being not substantially more than those amounts indicated on a graphical curve constructed by employing the acid concentrations 4.5 N, 8.5 N, and 15 N as coordinates in one plane and the tungstate concentrations 10%, 6.5% and 4%, as coordinates in the other plane, the points on the graph thus being 4.5, 10; 8.5, 6.5; and 15, 4.

In testimony whereof we hereunto affix our signatures.

WALTER A. PATRICK.
EARLE H. BARCLAY.